(12) United States Patent
Leum et al.

(10) Patent No.: US 6,368,043 B1
(45) Date of Patent: Apr. 9, 2002

(54) LOW-PROFILE TRUCK LEVELER

(75) Inventors: Grant Leum, Muskego; Jack Morehart, Janesville, both of WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/477,264

(22) Filed: Jan. 4, 2000

Related U.S. Application Data

(63) Continuation-in-part of application No. 09/391,557, filed on Sep. 8, 1999, now abandoned.

(51) Int. Cl.⁷ .............................................. B65G 69/28
(52) U.S. Cl. ...................................... 414/401; 14/71.7
(58) Field of Search ........................... 414/401; 14/71.7

(56) References Cited

U.S. PATENT DOCUMENTS

| | | | | |
|---|---|---|---|---|
| 2,489,869 A | * | 11/1949 | Dunn | 414/401 X |
| 2,637,454 A | * | 5/1953 | Rowe | 414/401 X |
| 4,012,804 A | * | 3/1977 | Catlett | 14/71.7 X |
| 4,264,259 A | * | 4/1981 | Hipp | 414/401 |
| 4,624,446 A | * | 11/1986 | Gould | 254/88 |
| 4,765,792 A | * | 8/1988 | Cherry et al. | 414/401 |
| 4,969,792 A | * | 11/1990 | Ellis et al. | 414/401 |
| 5,396,676 A | * | 3/1995 | Alexander et al. | 14/71.1 |
| 5,553,987 A | * | 9/1996 | Ellis | 414/401 |
| 5,762,459 A | * | 6/1998 | Springer et al. | 414/401 |
| 5,934,857 A | * | 8/1999 | Alexander | 414/401 |

FOREIGN PATENT DOCUMENTS

| | | | | |
|---|---|---|---|---|
| GB | 702701 | * | 1/1954 | 414/401 |
| GB | 916257 | * | 1/1963 | |

OTHER PUBLICATIONS

"Power Ramp" Herman Company 414/401, May 1953.*
"Rotary Truck Leveler" Rotary Lift Co. 414/401, May 1955.*
Installation and Service Manual; PIT and Surface Mounted Truck Leveler (Autoquip Corporation, Feb. 1997).

* cited by examiner

Primary Examiner—Steven A. Bratlie
(74) Attorney, Agent, or Firm—Marshall, Gerstein & Borun

(57) ABSTRACT

A truck leveler includes a low-profile traffic surface that is pivotally mounted to a driveway approach in front of a loading dock. Pivoting the leveler raises a reat portion of a truck or trailer to the height of the dock. The truck leveler has strength, rigidity and accommodates a retractable or repositionable wheel restraint while maintaining its low profile. This is accomplished by virtue of a raised rear beam and two lateral beams that extend above the traffic surface of the leveler. A central beam allows field assembly of the leveler while adding further to the leveler's strength and rigidity.

39 Claims, 7 Drawing Sheets

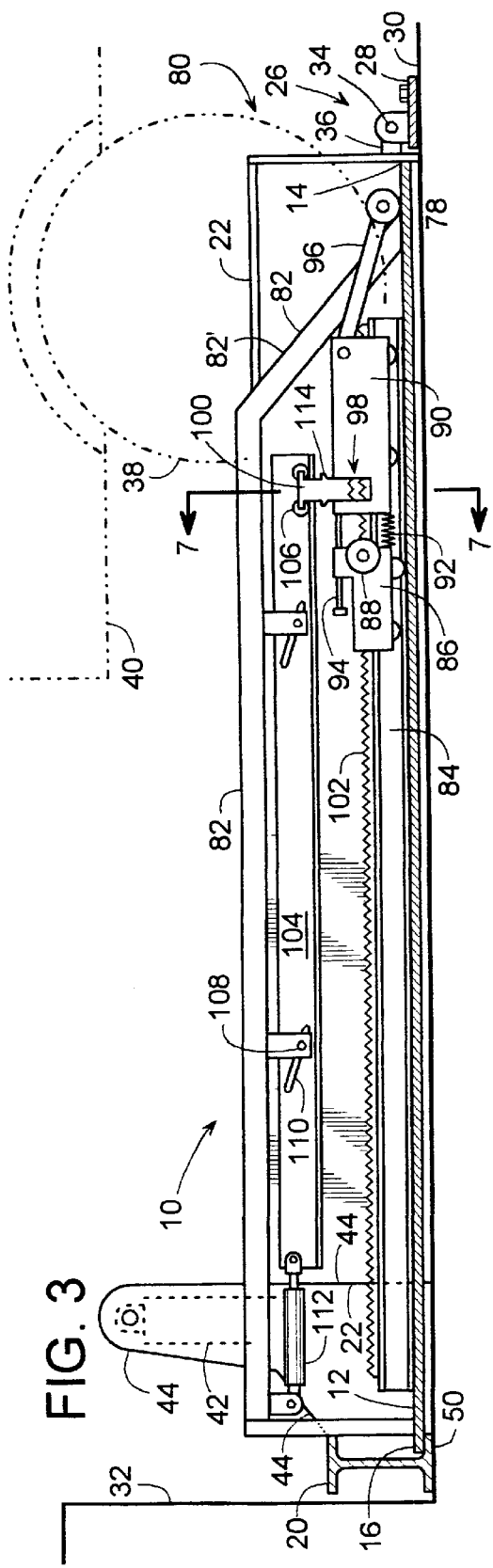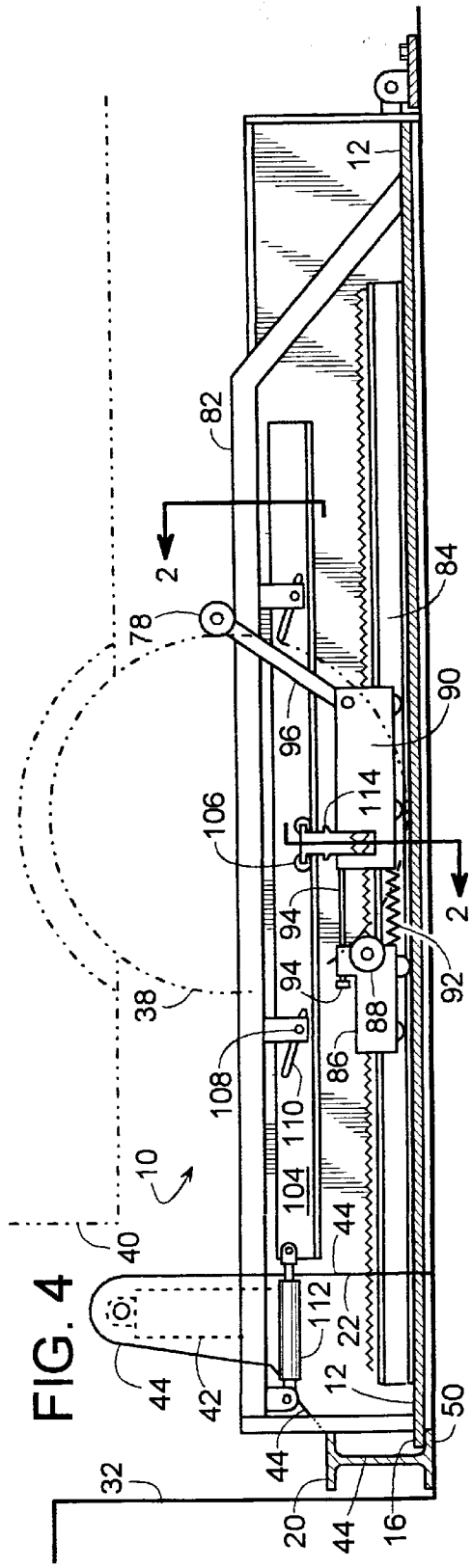

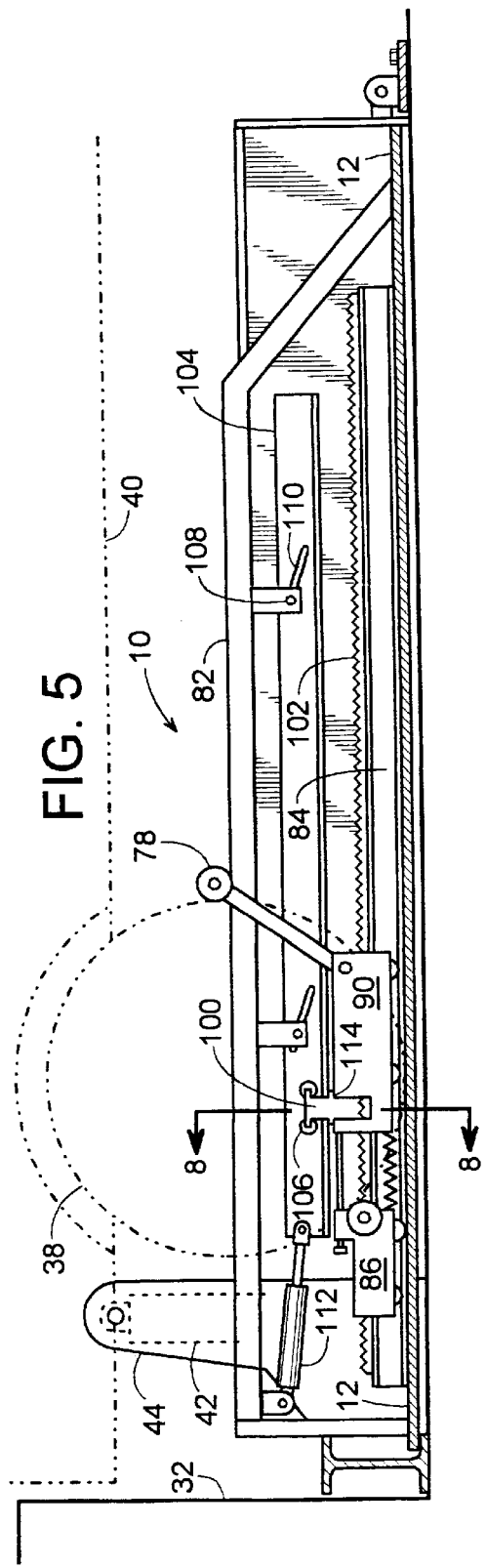
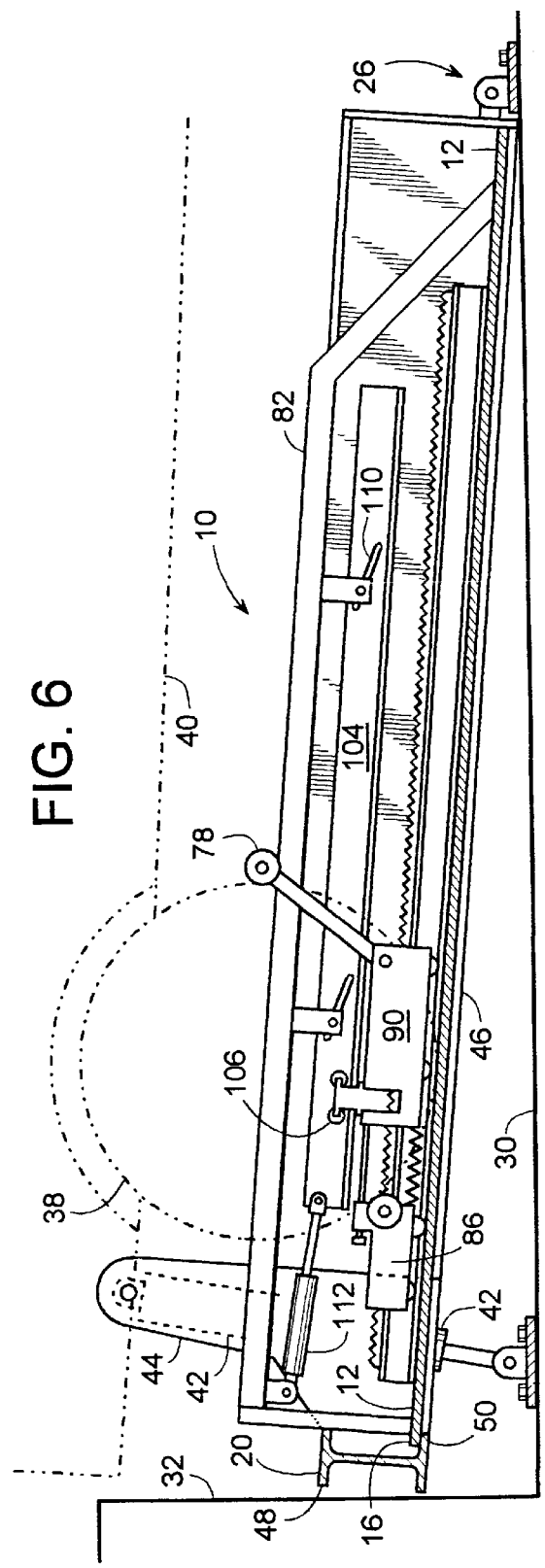

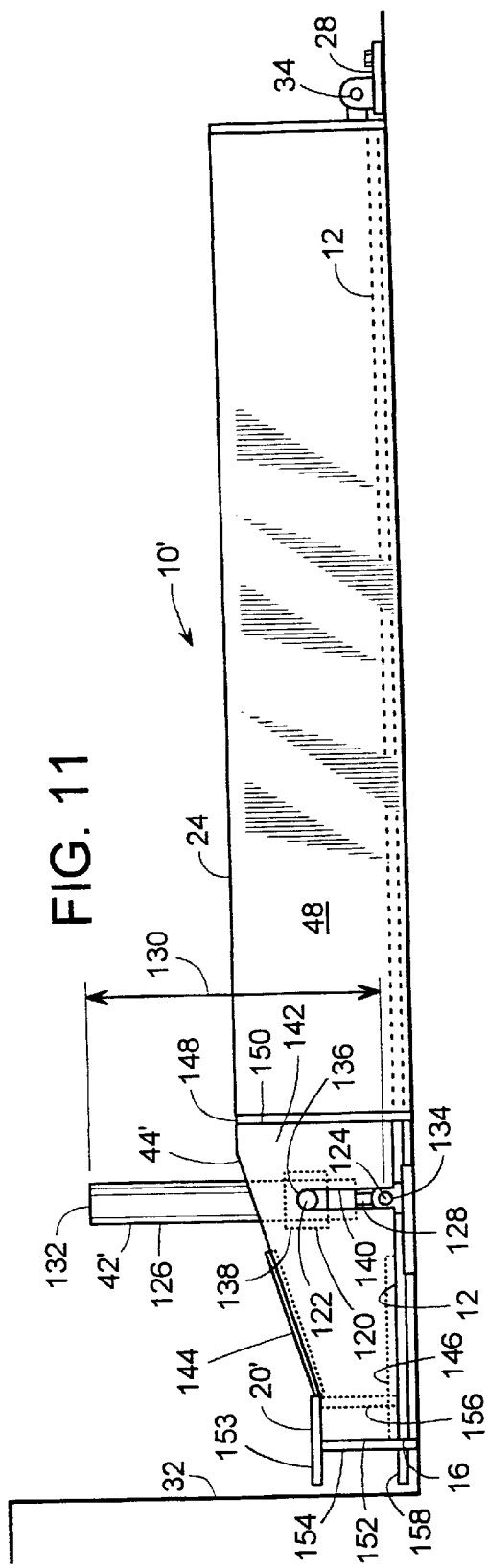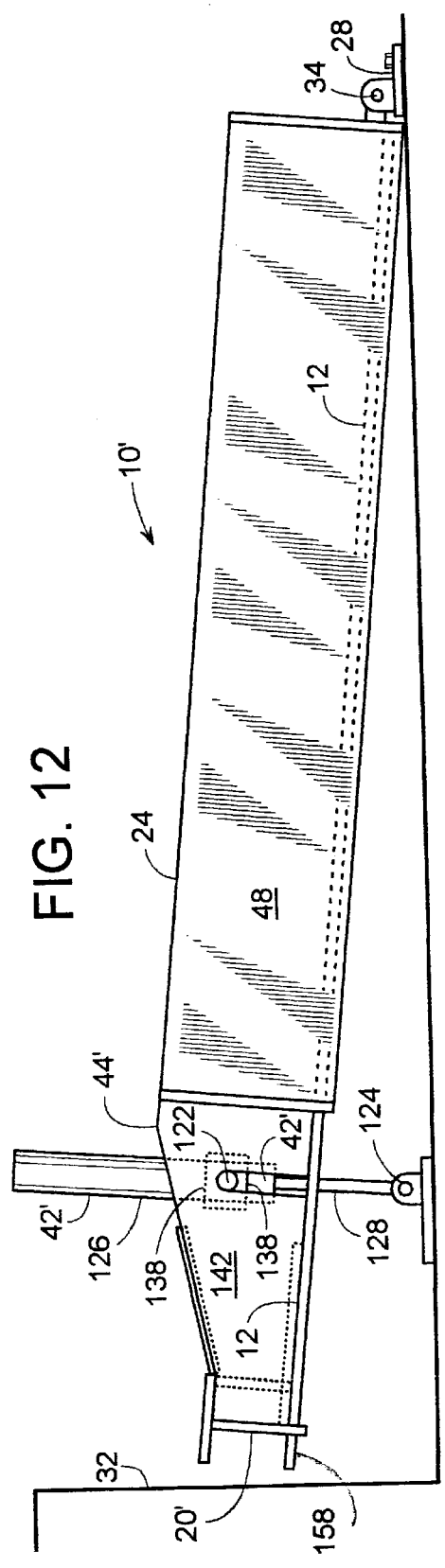

LOW-PROFILE TRUCK LEVELER

CROSS-REFERENCE TO RELATED APPLICATIONS

This application is a continuation-in-part of application Ser. No. 09/391,557 filed Sep. 8, 1999 abandoned.

BACKGROUND OF THE INVENTION

1. Field of the Invention

The subject invention generally pertains to vehicle levelers and more specifically to one with a low profile.

2. Description of Related Art

Truck levelers and dock levelers often work in conjunction with each other in docking a truck or trailer to a loading dock platform. A typical truck leveler includes a deck that extends between a vehicle-approach edge that is hinged to the driveway and a rear edge that is adjacent the face of the loading dock. As a truck backs its trailer or itself onto the deck, the deck pivots about the hinge to raise a rear portion of the vehicle so that the bed of the truck or trailer is closer to the height of the loading dock platform. A conventional dock leveler can then make up the remaining height differential and bridge the gap between the dock platform and the trailer bed to allow a forklift access to cargo on the trailer.

A typical dock leveler usually includes its own deck that has one edge pivotally coupled to the dock platform. The pivotal motion adjusts the height of an opposite, distal edge of the dock leveler's deck to roughly match the height of the truck's rear edge. A lip extension pivots outward from the distal edge of the dock leveler's deck to bridge the gap between the dock platform and the rear of the truck.

Newer model trucks and trailer beds continue to get lower to the ground, while existing dock heights remain at a fairly standard height of about 48 inches. This increases the need for truck levelers, as many conventional dock levelers alone are unable to effectively make up the ever increasing height differential. In some cases, the truck may be so low that the height differential may be beyond the travel limits of the dock leveler. In other cases, a conventional dock leveler must descend to create a ramp so steep that a forklift can no longer make the grade to get off the trailer and back onto the dock.

One solution has been to have longer dock levelers to minimize the angle created by the leveler. Such a solution, however, may not be desirable as it consume valuable floor space in loading dock areas that are typically congested.

A second solution is to have a conventional truck leveler raise the rear of the vehicle so that its bed more closely matches the height of the dock. However, raising the bed of a fully loaded trailer (plus the weight of a forklift) requires a leveler of substantial strength and rigidity. With current truck levelers, the strength and rigidity is achieved simply by adding reinforcing beams underneath the upper traffic surface of the leveler's deck. But the resulting added thickness of such a leveler creates some problems.

For example, although a conventional truck leveler may work well for lower trailer beds, a truck with a standard, higher bed on a relatively thick truck leveler may now end up too high. The dock leveler might not be able effectively reach up to the top edge of the elevated trailer bed, or a vehicle restraint (e.g., the type disclosed in U.S. Pat. No. 4,264,259) associated with the loading dock might not have enough upward travel to reach the truck's ICC bar. These problems can occur even if the truck leveler is left in its lowered position. Moreover, a relatively thick leveler can also create a significant obstruction over which a truck must drive, which can be a problem for both high and low truck/trailer beds.

To minimize the elevation of the upper traffic surface of a truck leveler, a leveler can be installed in a pit to place the traffic surface of the leveler generally flush with the driveway approach. However, such a pit is not only expensive, but can also create a reservoir in which water and debris can accumulate. The water may not only promote corrosion of the leveler, but the leveler may lockup entirely if the water freezes to it. Removing debris from underneath a truck leveler set in a pit becomes an unpleasant chore that is often neglected. This is due to the difficulty of reaching underneath a relatively expansive deck that may only rise a few inches for limited access.

Some truck levelers include a power wheel chock that prevents the truck from accidentally rolling away from the dock. To release the truck, the chock retracts below the drive-on surface of the leveler. Providing room for a retracted chock underneath the leveler can also make a truck leveler thicker, which can thus create all the problems already mentioned.

SUMMARY OF THE INVENTION

In order to provide a strong truck leveler that can accommodate a retractable wheel restraint while minimizing the height of the leveler's upper traffic surface, a pivotally mountable leveler is provided that includes two lateral beams that extend above the traffic surface.

In some embodiments, a track-mounted wheel restraint is added to the leveler with the track disposed above the leveler's upper traffic surface to provide the leveler with added strength and rigidity without increasing the height of the traffic surface unnecessarily.

In some embodiments, the leveler's deck includes a central joint to avoid having to transport and install one excessively large deck.

In some embodiments, a central beam is added to connect the central joint and add strength and rigidity to the leveler. The central beam can extend above the upper traffic surface to minimize the height of the traffic surface.

In some embodiments, the central beam includes an upper member, such as a flange or plate, that is displaced above the traffic surface to define an air gap between the two, thus creating a stronger beam with a minimal amount of material.

In some embodiments, a rear beam is disposed above the upper traffic surface to provide the traffic surface with strength and rigidity while minimizing the height of the surface.

In some embodiments, a wheel guide is provided to help keep the vehicle properly positioned on the upper traffic surface and/or to keep a vehicle from running up against the side of a wheel restraint that may be mounted on the traffic surface.

In some embodiments, a lift cylinder for a truck leveler is provided with a trunnion mount at an intermediate position along the length of the cylinder.

BRIEF DESCRIPTION OF THE DRAWINGS

FIG. 3 is a cross-sectional side view taken along line 3—3 of FIG. 1.

FIG. 4 is the same as FIG. 3, but with the vehicle and wheel restraint in a different position.

FIG. 5 is the same as FIG. 3, but with the vehicle and wheel restraint in a different position and with the wheel restraint fixed relative to the leveler platform.

FIG. 6 is the same as FIG. 5, but with the leveler in a raised position.

FIG. 11 is a side view of the leveler shown in FIG. 10, but with the vehicle restraint removed.

FIG. 12 is the same as FIG. 11, but with the leveler in a raised position.

DESCRIPTION OF THE PREFERRED EMBODIMENT

Figure 1:
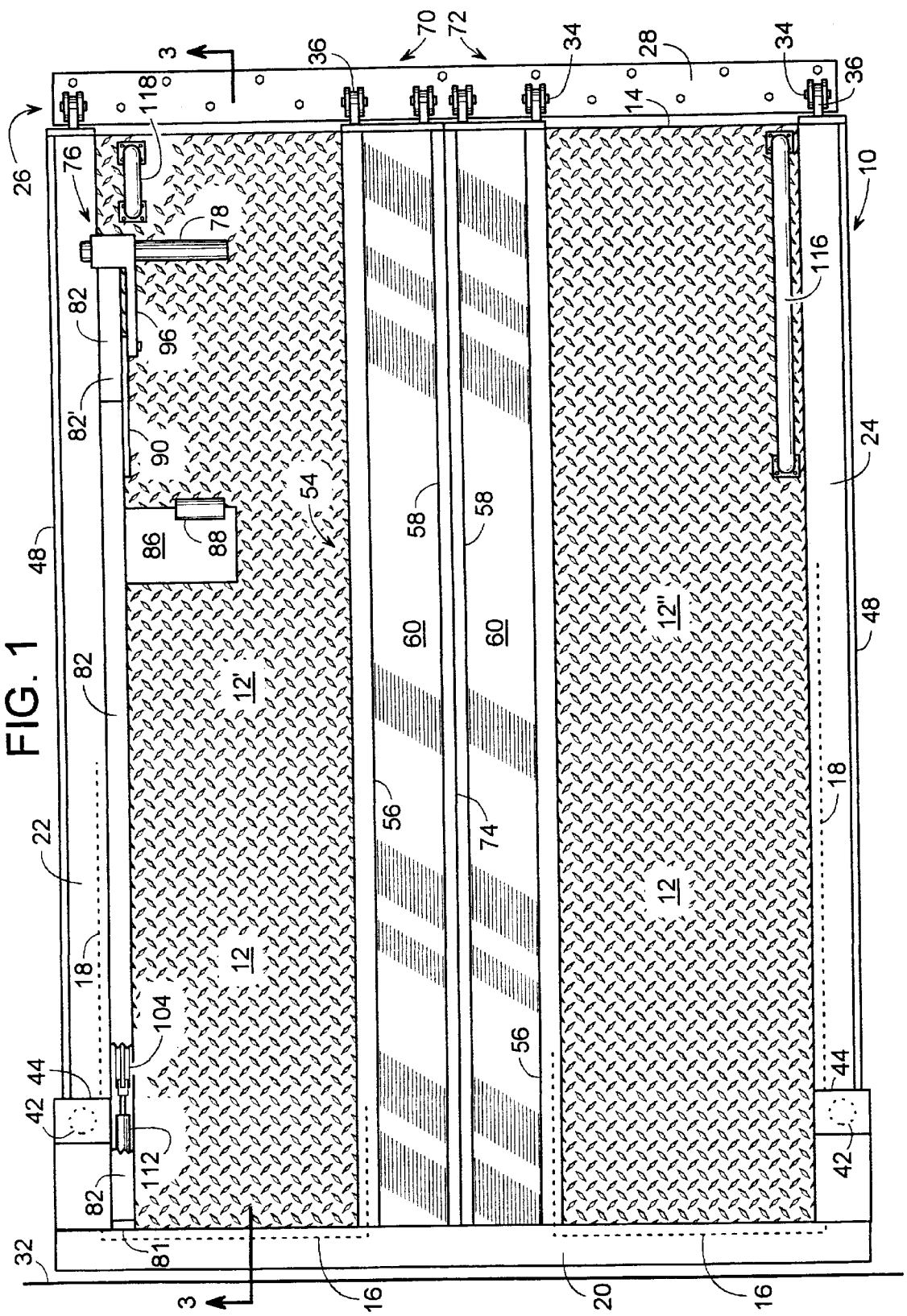
FIG. 1 is a top view of a leveler according to one embodiment.
Figure 2:
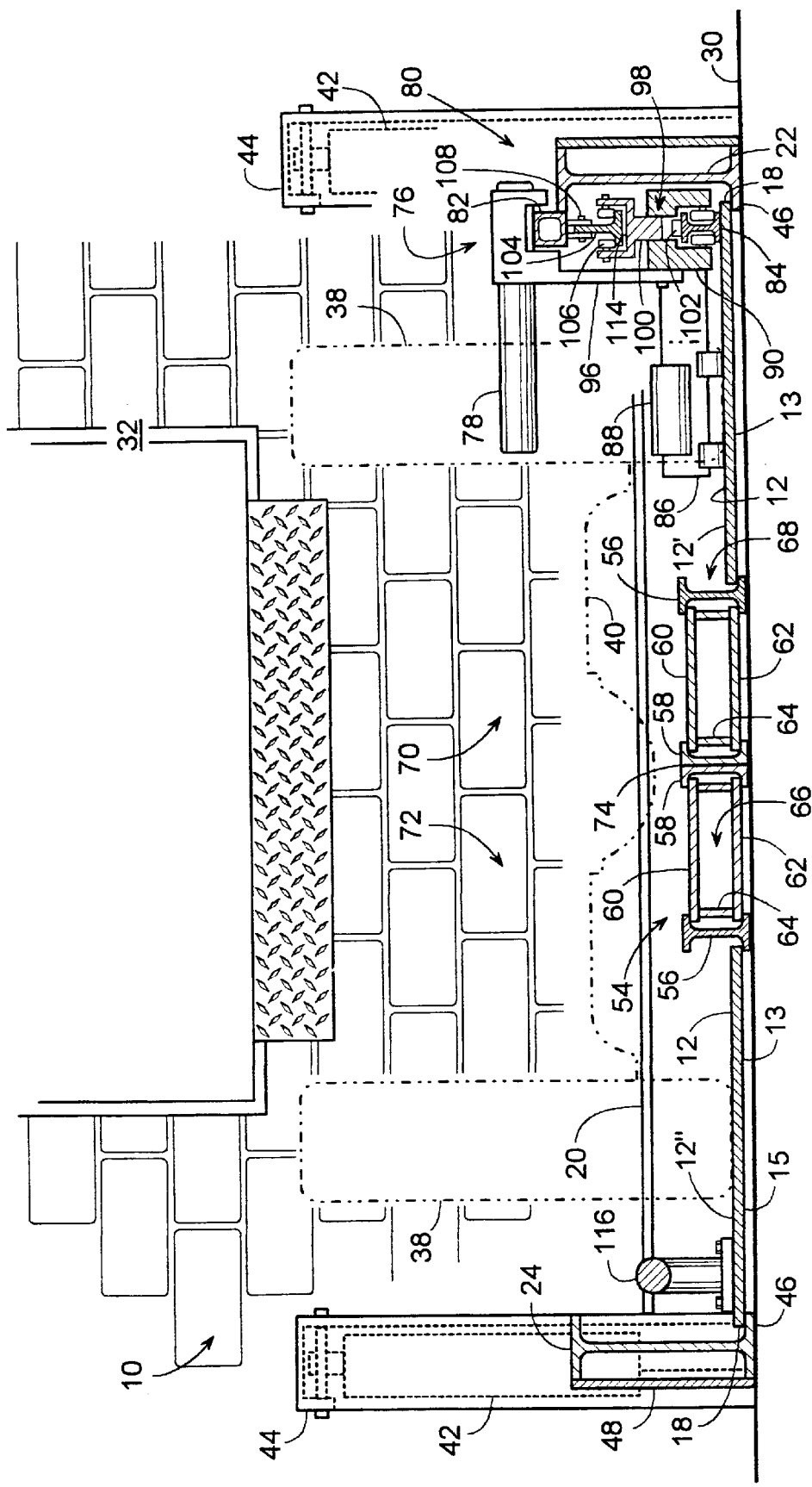
FIG. 2 is a cross-sectional end view taken generally along line 2—2 of FIG. 4.

In order to provide a strong, low-profile truck leveler that can accommodate a retractable or repositionable wheel restraint, a pivotally mountable leveler 10 is provided as shown in FIGS. 1 and 2. Leveler 10 includes a relatively thin deck (e.g., solid plate, expanded plate, fabricated grate, etc.) having an upper traffic surface 12 (smooth or textured) extending in one direction between a vehicle-approach edge 14 and a rear edge 16, and extending in another direction between two lateral edges 18. Traffic surface 12 is supported by a rear beam 20 and two lateral beams 22 and 24 that extend above the traffic surface. A hinge 26 having a hinge plate 28 anchored to a driveway 30 in front of a loading dock 32 and having hinge pins 34 connected to vehicle-approach edge 14 by way of lugs 36, renders leveler 10 pivotal to vertically adjust rear edge 16 of traffic surface 12. With rear wheels 38 of a vehicle 40, such as a truck or trailer, parked on traffic surface 12, the pivotal motion of leveler 10 vertically adjusts the height of vehicle 40 to roughly match the height of loading dock 32.

To pivot leveler 10, an actuator acts between driveway 30 and leveler 10. For example, in one embodiment the actuator includes two hydraulic cylinders 42 each of which include one end pivotally anchored to driveway 30 and an opposite end pinned to a housing 44. One housing 44 couples lateral beam 22 to rear beam 20 while a second housing 44 couples lateral beam 24 to rear beam 20. Cylinders 42 extend to push upward against housings 44, which raises rear edge 16 as upper traffic surface 12 pivots about hinge pins 34 near vehicle-approach edge 14. It should be appreciated by those skilled in the art that the type and number of actuators and the associated hardware for coupling the actuator between leveler 10 and driveway 30 could vary widely. However, the preferred embodiment provides a location for cylinders 42 that minimizes the total width of leveler 10.

To minimize the lowered height of upper traffic surface 12, support beams 20, 22 and 24 are disposed primarily above traffic surface 12 (i.e., most of the beam is above upper traffic surface 12, but not necessarily extending over the top of surface 12). For example, in one embodiment, lateral beams 22 and 24 are structural I-beams running between (but not necessarily up to) approach edge 14 and rear edge 16, and having a lower flange 46 welded underneath traffic surface 12 generally along lateral edges 18. The term, "running" refers to the direction along which the length of the beam extends. A side plate 48 is welded to each lateral beam 22 and 24 to create a stronger, more rigid box-like beam structure. By having lower flange 46 of beams 22 and 24 extend underneath traffic surface 12, flange 46 serves as a shelf (approximately 0.35 inches thick) upon which traffic surface 12 is supported more positively.

The actual structure of upper traffic surface 12 can vary widely; however, to provide surface 12 with the necessary structural integrity while minimizing its lowered height, traffic surface 12 is preferably provided by a relatively thin steel plate 13 of a nominal ¾-inch thickness. Plate 13 includes a lower surface 15 that is substantially parallel to upper surface 12 and generally faces driveway 30. With leveler 10 in its lowered position of FIGS. 1–5, lower surface 15 is immediately adjacent (e.g., generally separated only by air) and/or touching driveway 30. For example, in some embodiments, the resilience of plate 13 and its proximity to driveway 30 is sufficient to allow plate 13 to bend elastically against driveway 30. In this way, the weight of vehicle 40 is able to push portions of lower surface 15 against driveway 30, but plate 13 is still able to spring back to its normal, unstressed condition after vehicle 40 departs.

To provide upper traffic surface 12 with an appreciable amount of rigidity along a direction generally perpendicular to that provided by lateral beams 22 and 24, rear beam 20 is disposed along rear edge 16. The term, "appreciable amount of rigidity" refers to rear beam 20 contributing at least ten percent of the total rigidity along the general vicinity (i.e., within six inches) of rear edge 16. Preferably, rear beam 20 contributes most of the rigidity along the rear edge region of plate 13. In one embodiment, rear beam 20 is a structural I-beam having a lower flange 50 welded to plate 13 along rear edge 16. In the illustrated example, rear beam 20 is lower than lateral beams 22 and 24 to avoid possibly interfering with a dock leveler or a vehicle's ICC bar.

For even greater support and rigidity, a central beam 54 is welded or otherwise attached to a central portion of platform 12, between lateral edges 18 and extending above upper traffic surface 12. Central beam 54 has a length running in a direction that traverses approach edge 14 and rear edge 16, but beam 54 does not necessarily extend across or even up to those edges. In some embodiments, central beam 54 runs parallel to lateral beams 22 and 24; however, it is well within the scope of the invention to have lateral beams 22 and 24 converge inward from approach edge 14 to rear edge 16. This could serve as a converging lead-in for a vehicle backing onto the leveler. Central beam 54 can be a unitary structural beam such as a bar, I-beam, rectangular tube, or channel; or it can be an assembly of components.

For example, in one embodiment, central beam 54 comprises a fabrication of two I-beams 56, two channels 58, two top plates 60, two bottom plates 62, and spacer bars 64 that separate the top plates from the bottom ones. A gap 66 between plates 60 and 62 and another gap 68 between upper and lower flanges of I-beam 56 results in a central beam 54 whose cross-sectional moment of inertia provides a rigid beam with a minimal amount of material and height. The central beam assembly allows leveler 10 as a whole to be assembled from a group of smaller components at the installation site rather than installed as one large leveler.

In particular, for a new leveler installation, to avoid having to transport an over-sized load over the highway and to avoid having to handle and install a rather wide and heavy leveler, leveler 10 is broken down into four major components. In one embodiment, platform 12 comes in two separate pieces: a right surface 12' and a left surface 12". The four major components or subassemblies then include a right portion 70, a left portion 72, rear beam 20 and hinge 26. Right portion 70 comprises lateral beam 22, right surface 12' and the right-side set (as viewed in FIG. 2) of I-beam 56, channel 58, top plate 60, bottom plate 62 and spacers 64. Left portion 72 comprises lateral beam 24, left surface 12" and the left-side set of I-beam 56, channel 58, top plate 60, bottom plate 62 and spacers 64. During installation, welding or otherwise joining channels 58 back-to-back provides a way for central beam 54 to connect a central joint 74 between right surface 12' and left surface 12" of platform 12. However, the joining of channels 58 can also be accomplished by relying solely on rear beam 20 and hinge 26 being welded or otherwise attached to each end of each channel 58. With the later approach, channels 58 are effectively joined at each end but not along their lengths. Rear beam 20 and hinge 26 connect to upper traffic surface 12 and lateral beams 22 and 24 as described earlier.

In some cases, it is desirable to provide a leveler with an automatic wheel restraint to prevent a vehicle from accidentally rolling away from the dock. If properly designed, a wheel restraint can actually add to the rigidity of the leveler without unnecessarily raising the lowered height of the leveler's upper traffic surface. To this end, leveler 10 is provided with a wheel restraint 76 as illustrated schematically in FIGS. 1–6 and as described in detail in U.S. Pat. No. 5,762,459, which is specifically incorporated by reference herein. Wheel restraint 76 includes a wheel barrier 78 (preferably in the form of a roller) mounted to travel along a support structure 80 that is disposed primarily above traffic surface 12 (i.e., most of support structure 80 is above but not necessarily extending over upper traffic surface 12).

In the embodiment of FIGS. 3—5, for example, support structure 80 includes an upper track 82 (e.g., a supporting member in the form of a rectangular tube) fixed relative to upper traffic surface 12 by way of a vertical, horizontal, angled, and/or an L-shaped post as represented by numeral 81. Post 81 can connect upper track 82 to rear beam 20, lateral beam 22 or 24, and/or directly to upper traffic surface 12. Support structure 80 also includes a lower track 84 (e.g., a guide member in the form of an I-beam) anchored to upper traffic surface 12.

A trigger assembly 86 rolling on upper traffic surface 12 and guided by lower track 84 includes a tire engaging roller 88. Roller 88 extends into the tire path of vehicle 40, so that as vehicle 40 backs onto leveler 10, wheel 38 pushes against roller 88 to move trigger assembly 86 to the left (as viewed in FIGS. 3 and 4. A trolley assembly 90 connected to travel along lower track 84 generally follows the leftward movement of trigger assembly 86 with barrier 78 being urged against a forward portion of wheel 38. This is due to trigger assembly 86 and trolley assembly 90 being coupled to each other by way of one or more springs 92. A slide bar 94 limits the maximum separation distance between trigger assembly 86 and trolley assembly 90. Trolley assembly 90 moving to the left, pulls barrier 78 along upper track 82 by way of a locking arm 96 that couples barrier 78 to trolley assembly 90. Barrier 78 traveling along ramp portion 82' of track 82 moves barrier 78 between a lowered or retracted position (FIG. 3) where wheel 38 is free roll up and over barrier 78 and a raised wheel-blocking position (FIGS. 4 and 5).

With vehicle 40 properly parked on leveler 10 with the rear of the vehicle generally adjacent the face of loading dock 32, a locking mechanism 98 fixes barrier 78 relative to support structure 80. Locking mechanism 98 can be provided by a variety of structures. For example, in one embodiment, locking mechanism 98 includes a toothed element 100 (e.g., an engaging surface) that slides vertically within trolley assembly 90. By moving vertically, element 100 selectively engages and disengages a mating toothed rack 102 disposed on top of lower track 84. Element 100 engaging rack 102 fixes trolley assembly 90 relative to lower track 84, which in turn fixes barrier 78 relative to upper traffic surface 12 to provide an obstruction that prevents wheel 38 from accidentally moving entirely away from dock 32.

To move element 100 between its disengaged and engaged position, an inverted structural T-member 104 (e.g., a latching bar) respectively raises and lowers element 100. Element 100 includes rollers 106 that hold element 100 up in its disengaged position (FIGS. 3 and 4) while allowing element 100 to travel along T-member 104 as trolley assembly 90 moves along lower track 84. Cross-pins 108 fixed relative to upper track 82 extend in a sliding-fit relationship within angled slots 110 of T-member 104. To lower T-member 104 and consequently lower element 100 into engagement with rack 102, a linear actuator 112, such as an electromechanical actuator or a hydraulic or pneumatic cylinder, extends to move T-member 104 to the right. As T-member 104 moves to the right, its angled slots 110 in conjunction with pins 108 force T-member 104 to move downward also. As T-member 104 moves down and away from rollers 106, the underside of T-member 104 pushes downward against an upper edge 114 of element 100 to force element 100 into engagement with mating rack 102, as shown in FIG. 5. To disengage element 100, actuator 112 retracts to move T-member 104 to the left. This also raises T-member 104 back up against rollers 106 to lift element 100 upward away from rack 102. Of course, the right/left and up/down movement can be reversed, if desired, by reversing the inclination of slots 110.

Figure 7:
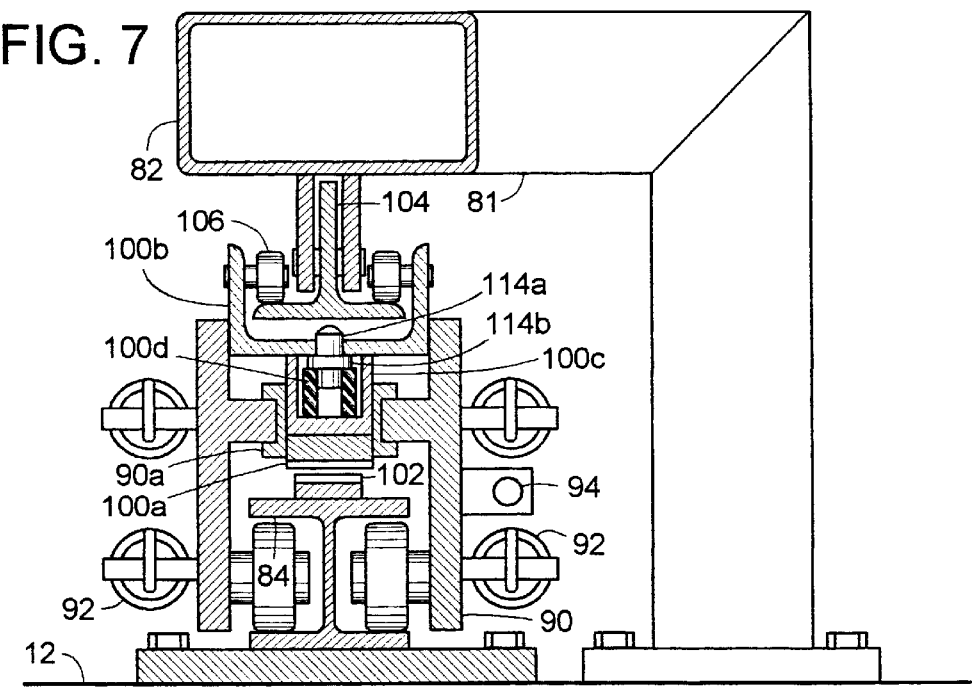
FIG. 7 is a cross-sectional end view taken along line 7—7 of FIG. 3, but showing more detail than what is schematically illustrated in FIG. 3.
Figure 8:
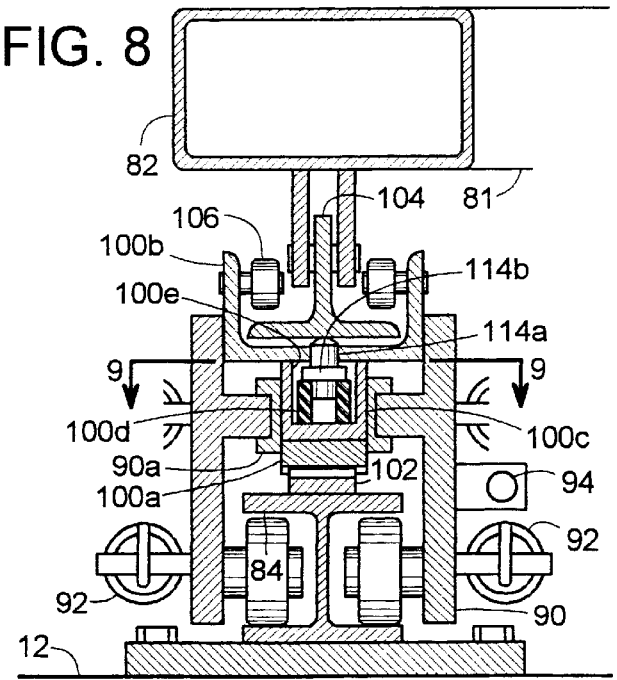
FIG. 8 is a cross-sectional end view taken along line 8—8 of FIG. 5, but showing more detail than what is schematically illustrated in FIG. 5.
Figure 9:
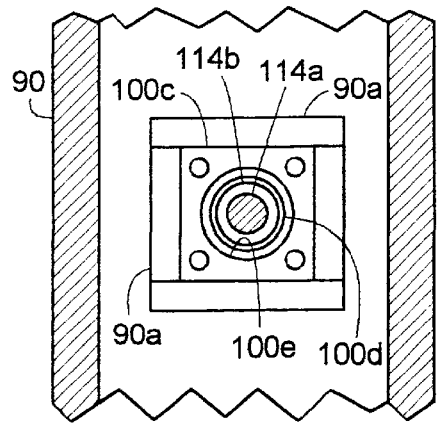
FIG. 9 is a cross-sectional top view taken along line 9—9 of FIG. 8.

Since FIGS. 2—6 provide a schematic illustration of locking mechanism 98, additional details of locking mechanism 98 are shown in FIGS. 7—9. In this example, toothed element 100 comprises a relatively short toothed segment 10a fixed relative to a channel member 100b by way of bushing 100c. Bushing 100c has a rectangular periphery that slides within a rectangular sleeve 90a. Sleeve 90a comprises four separate sleeve segments to facilitate the assembly of sleeve 90a within trolley assembly 90. The mating rectangular shapes of bushing 100c and sleeve 90a help keep toothed segment 100a in a proper rotational orientation relative to toothed rack 102. Upper edge 114 is partially provided by a pin 114a that slides within a hole in channel 100b. A compression spring 100d disposed within an inner bore 100e of bushing 100c urges a shoulder 114b on pin 114a up against a lower surface of channel 10b. With this arrangement, T-bar 104 in its raised position lifts rollers 106, which in turn lifts channel 100b and segment 100a to its disengaged position, as shown in FIG. 7. T-bar 104 in its lowered position pushes downward against the top of pin 114a to urge segment 100a into engagement with rack 102. However, if the teeth or peaks of segment 100a and rack 102 happen to interfere with each other to prevent their interlocking engagement, spring 100d compresses to allow pin 114a to retract within 100c. Later, a slight movement or shift of trolley assembly 90 would allow spring 100d to push segment 100a into full engagement with rack 102.

FIGS. 3 through 6 generally illustrate an overall operating sequence of leveler 10. In FIG. 3, vehicle 40 enters the loading dock area by backing onto leveler 10, so that its wheel 38 rolls up and over barrier 78 (in its lowered position). Two rear wheels 38 of vehicle 40 generally straddle central beam 54, while one or more optional wheel guides 116 and 118 provide a lateral obstacle that helps keep vehicle 40 properly positioned on upper traffic surface 12, as shown in FIGS. 1 and 2. Referring to FIG. 4, as vehicle 40 continues to move back toward dock 32, a rear portion of wheel 38 pushing against roller 88 pushes trigger assembly 86 back also. This, in turn, moves trolley assembly 90 back toward dock 32 to pull barrier 78 along upper track 82, while barrier 78 rides against a front portion of wheel 38. Referring to FIG. 5, once vehicle 40 is backed generally up against or adjacent the face of dock 32, actuator 112 extends to fix barrier 78 relative to upper traffic surface 12, thus blocking wheel 38 to prevent vehicle 40 from accidentally rolling away from dock 32. Referring to FIG. 6, with vehicle 40 properly restrained, cylinders 42 extend to lift rear edge 16 of leveler 10 until the rear portion of vehicle 40 roughly matches the height of loading dock 32.

To release vehicle 40 after it is loaded or unloaded of its cargo, cylinders 42 retract to lower leveler 10. Actuator 112 then retracts to release front trolley 90. Then vehicle 40 pulls ahead, while wheel 38 pushes barrier 78 forward to its lowered or unblocking position of FIG. 3. While moving forward, barrier 78 pulls trolley assembly 90 and trigger assembly 86 with it, so that they return to their proper positions where they are ready for the next vehicle.

Figure 10:
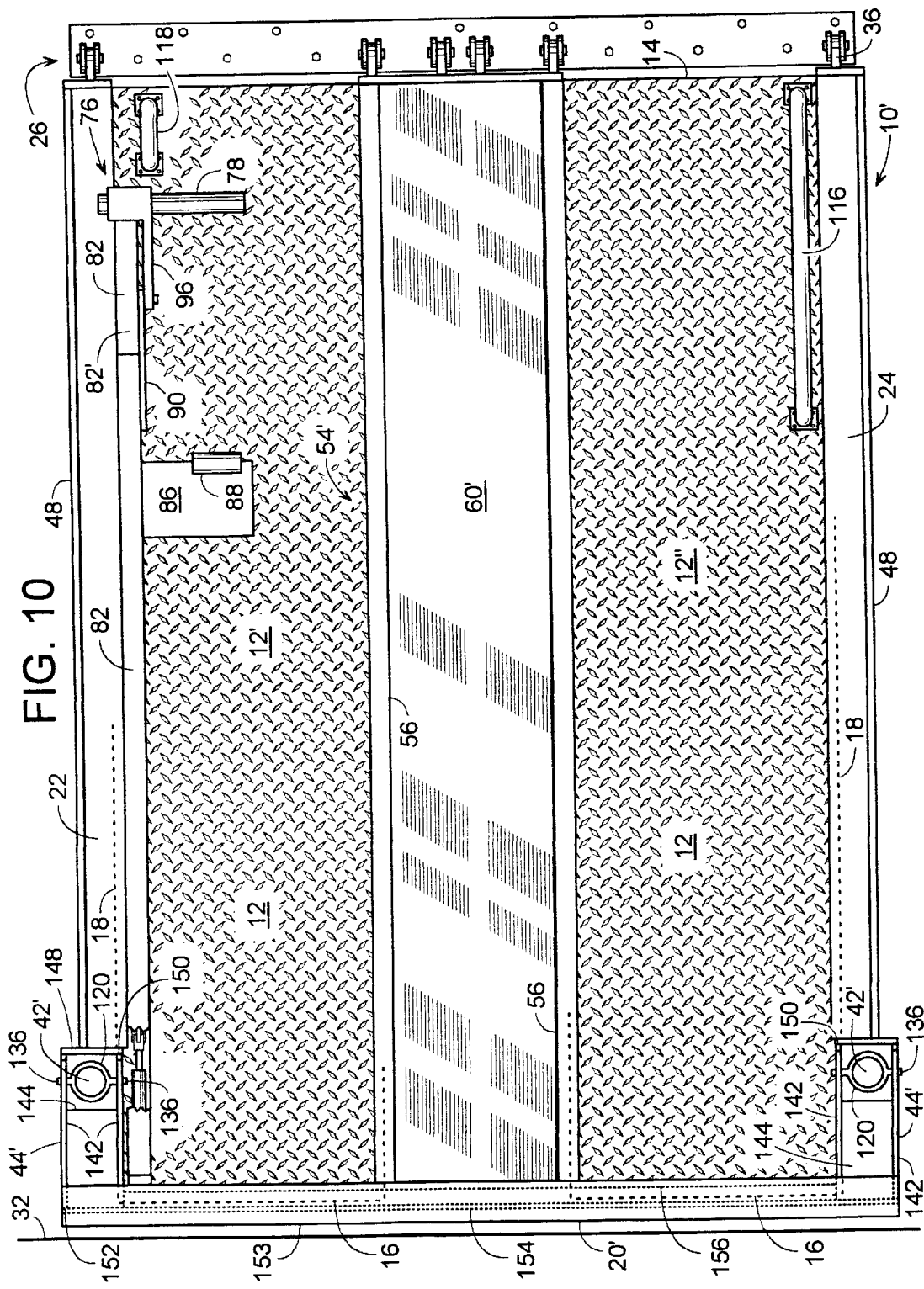
FIG. 10 is a top view of a leveler according to another embodiment.

FIGS. 10–12 illustrates a vehicle leveler 10', which is an alternate embodiment similar to leveler 10. With leveler 10', however, a cylinder 42' includes a mount 120 that reduces the buckling loads and other bending loads on cylinder 42' by reducing the distance between the cylinder's mounting points 122 and 124. Cylinder 42' includes a cylinder housing 126 with an extendible rod 128 to provide cylinder 42' with a variable overall length 130. Mount 120 is attached to cylinder housing 126 at an intermediate position between a cylinder base 132 of housing 126 and a rod end 134 of rod 128. In this example, mount 120 is a trunnion comprising two pivot pins 136 that protrude from a collar 138 that is welded or otherwise attached to cylinder housing 126. Each pin 136 pivotally engages the upper end of a slot 140 that extends generally vertically along a lift box 44'. Rod end 134 is pivotally attached at point 124, which is anchored to the floor of dock 32.

In this particular embodiment, lift box 44' comprises a fabricated structure that includes two slotted side plates 142, an angled top plate 144, and a bottom plate 146. A transitional plate 148 couples one end 150 of lift box 44' to lateral beam 22 or 24, while an opposite end 152 of lift box 44' connects to a fabricated rear beam 20'. In this example, rear beam 20' includes a top beam 153, two generally vertical beams 154 and 156, and a lower beam 158. Upper traffic surface 12 rests upon lower flange 46 of lateral beams 22 and 24, catches the underside of lift box 44', and attaches to rear beam 20' at vertical beams 152 and 156.

Trunnion pins 136 engaging the upper end of slots 140 allow the extension and retraction of cylinder 42' to raise and lower lift box 44' and thus move a rear edge 16 of traffic surface 12 between a lowered position and a raised position, as shown in FIGS. 11 and 12 respectively. If the raised height is inadequate for some reason, cylinder 42' can be readily replaced with another cylinder having a longer stroke. Since the cylinder is trunnion mounted at an intermediate position, changing to a longer cylinder is readily accomplished without having to modify lift box 44'.

Moreover, slots 140 being open at the bottom of lift box 44' allows cylinder 42' to be readily replaced or serviced by raising lift box 44' (i.e., tilting leveler 10' upward) until trunnion pins 136 can simply slip out from within slots 140. Separate lifting equipment can be used to raise lift box 44', or cylinders 42' themselves can be used to raise lift box 44'. Once raised, leveler 10' can be blocked or otherwise supported in the raised position to allow cylinders 42' to retract out from within slots 140.

Another feature provided in the embodiment leveler 10' is a simplified central beam 54'. Beam 54' is similar to beam 54 of leveler 10; however, channels 58 are eliminated and the two top plates 60 are replaced by a single extra wide top plate 60' that extends between I-beams 56. Likewise, the two lower plates 62 of leveler 10 are also replaced by a single extra wide lower plate. As with leveler 10, spacer bars 64 are used where needed.

Although the invention is described with reference to a preferred embodiment, it should be appreciated by those skilled in the art that various modifications are well within the scope of the invention. Therefore, the scope of the invention is to be determined by reference to the claims that follow.

What is claimed is:

1. A vehicle leveler to be pivotally mounted to a driveway to adjust the elevation of at least two wheels of a vehicle parked on the leveler, comprising:
 a plate having an upper traffic surface extending between a vehicle-approach edge to a rear edge of the plate and also extending between two lateral edges of the plate, wherein the vehicle-approach edge is adapted to be pivotally coupled to the driveway to vertically adjust the elevation of the rear edge, the plate also having a lower surface substantially parallel to and opposite the upper traffic surface, wherein the lower surface is immediately adjacent the driveway when the plate is in the lowered position; and
 a rear beam disposed above the upper traffic surface and running adjacent the rear edge to add an appreciable amount of rigidity to the plate.

2. The vehicle leveler of claim 1, wherein most of the rigidity of the upper traffic surface along the rear edge is provided by the rear beam.

3. The vehicle leveler of claim 1, wherein the upper traffic surface also extends between two lateral edges each of which run in a first direction that traverses the vehicle approach edge, and further comprising a central beam interposed between the two lateral edges and extending above the upper traffic surface, wherein the central beam runs in a second direction traversing the vehicle-approach edge, whereby the central beam is adapted to be situated between the two wheels when the vehicle is parked on the upper traffic surface.

4. The vehicle leveler of claim 3, wherein the plate comprises a right plate and a left plate each extending between the vehicle-approach edge and the rear edge and each being coupled to each other by the central beam.

5. The vehicle leveler of claim 1, further comprising two lateral beams spaced apart from each other, connected to the plate, disposed above the upper traffic surface, and running between the vehicle-approach edge and the rear edge.

6. The vehicle leveler of claim 5, further comprising a wheel restraint situated to remain primarily above the upper traffic surface and adapted to obstruct at least one of the two wheels, wherein the wheel restraint includes a track that is biased off to one side of the leveler to allow the vehicle to travel between the track and one of the two lateral beams.

7. The vehicle leveler of claim 1, further comprising a wheel restraint situated to remain primarily above the upper traffic surface and adapted to obstruct at least one of the two wheels.

8. The vehicle leveler of claim 7, wherein a portion of the wheel restraint is adapted to be repositioned by movement of the vehicle.

9. The vehicle leveler of claim 7, further comprising a wheel guide substantially fixed relative to the upper traffic surface and adapted to guide at least one of the two wheels relative to the wheel restraint.

10. The vehicle leveler of claim 1, further comprising a cylinder that includes a cylinder housing and an extendible rod, wherein the cylinder has a variable overall length extending from a cylinder base to a rod end, and further comprising a mount attached to the cylinder housing at an intermediate position between the cylinder base and the rod end, wherein the mount couples the cylinder housing to the plate such that the elevation of the rear edge of the plate varies with the variable overall length of the cylinder.

11. The vehicle leveler of claim 10, wherein the mount is a trunnion.

12. A vehicle leveler adapted to be pivotally mounted to a driveway to adjust the elevation of at least two wheels of a vehicle parked on the leveler, comprising:
    an upper traffic surface extending between a vehicle-approach edge to a rear edge of the upper traffic surface, wherein the vehicle-approach edge is adapted to be pivotally coupled to the driveway to vertically adjust the elevation of the rear edge; and
    a wheel restraint including a barrier and a support structure, wherein the support structure is disposed primarily above the upper traffic surface and supports the barrier which, in turn, is moveable relative to the support structure to selectively obstruct and release at least one of the two wheels of the vehicle.

13. The vehicle restraint of claim 12, wherein the upper traffic surface also extends between two lateral edges each of which run in a first direction that traverses the vehicle approach edge, and further comprising a central beam interposed between the two lateral edges and extending above the upper traffic surface, wherein the central beam runs in a second direction traversing the vehicle-approach edge, whereby the central beam is adapted to be situated between the two wheels when the vehicle is parked on the upper traffic surface.

14. The vehicle leveler of claim 13, wherein the upper traffic surface comprises a right surface and a left surface each extending between the vehicle-approach edge and the rear edge and each being coupled to each other by the central beam.

15. The vehicle leveler of claim 12, further comprising a rear beam disposed above the upper traffic surface and running adjacent the rear edge to add rigidity to the upper traffic surface.

16. The vehicle leveler of claim 12, further comprising two lateral beams spaced apart from each other, connected to the upper traffic surface, disposed above the upper traffic surface, and running between the vehicle-approach edge and the rear edge.

17. The vehicle leveler of claim 12, further comprising a wheel guide substantially fixed relative to the upper traffic surface and adapted to guide at least one of the two wheels relative to the wheel restraint.

18. The vehicle leveler of claim 12, wherein the support structure is biased off to one side of the upper traffic surface to allow the vehicle to drive onto the upper traffic surface without having to travel over the support structure.

19. The vehicle leveler of claim 12, wherein a portion of the wheel restraint is adapted to be repositioned by movement of the vehicle.

20. The vehicle leveler of claim 12, further comprising a cylinder that includes a cylinder housing and an extendible rod, wherein the cylinder has a variable overall length extending from a cylinder base to a rod end, and further comprising a mount attached to the cylinder housing at an intermediate position between the cylinder base and the rod end, wherein the mount couples the cylinder housing to the upper traffic surface such that the elevation of the rear edge of the upper traffic surface varies with the variable overall length of the cylinder.

21. The vehicle leveler of claim 20, wherein the mount is a trunnion.

22. A vehicle leveler adapted to be pivotally mounted to a driveway to adjust the elevation of at least two wheels of a vehicle parked on the leveler, comprising:
    a plate having an upper traffic surface extending between a vehicle-approach edge to a rear edge of the plate and also extending between two lateral edges of the plate, wherein the vehicle-approach edge is adapted to be pivotally coupled to the driveway to vertically adjust the elevation of the rear edge, the plate also having a lower surface substantially parallel to and opposite the upper traffic surface, wherein the lower surface is immediately adjacent the driveway when the plate is in the lowered position; and
    a central beam interposed between the two lateral edges, rigidly attached to a bottom edge portion of the plate and extending above the upper traffic surface, wherein the central beam has a first length that runs in a first direction traversing the vehicle-approach edge and the rear edge, whereby the central beam is adapted to be situated between the two wheels when the vehicle is parked on the upper traffic surface.

23. The vehicle leveler of claim 22, wherein the plate comprises a right plate and a left plate each extending between the vehicle-approach edge and the rear edge and each being coupled to each other by the central beam.

24. The vehicle leveler of claim 22, wherein the central beam includes an upper plate displaced above the upper traffic surface to define a gap therebetween.

25. The vehicle leveler of claim 22, further comprising a rear beam extending above the upper traffic surface, disposed adjacent the rear edge, and having a second length that runs in a second direction traversing the first direction.

26. The vehicle leveler of claim 22, further comprising two lateral beams extending above the upper traffic surface and coupled to the plate at a location adjacent the two lateral edges, wherein each of the two lateral beams have a third length that runs in a third direction traversing the vehicle-approach edge and the rear edge.

27. The vehicle leveler of claim 22, further comprising a wheel restraint adapted to obstruct at least one of the two wheels of the vehicle.

28. The vehicle leveler of claim 27, wherein the wheel restraint remains primarily above the upper traffic surface.

29. The vehicle leveler of claim 27, wherein the wheel restraint includes a track that is biased off to one side of the leveler to allow the vehicle to travel between the track and one of the two lateral edges.

30. The vehicle leveler of claim 27, wherein a portion of the wheel restraint is adapted to be repositioned by movement of the vehicle.

31. The vehicle leveler of claim 27, further comprising a wheel guide substantially fixed relative to the upper traffic surface and adapted to provide a lateral obstruction to at least one of the two wheels to inhibit the vehicle from moving over at least one of the two lateral edges.

32. The vehicle leveler of claim 22, further comprising a cylinder that includes a cylinder housing and an extendible rod, wherein the cylinder has a variable overall length extending from a cylinder base to a rod end, and further comprising a mount attached to the cylinder housing at an intermediate position between the cylinder base and the rod end, wherein the mount couples the cylinder housing to the plate such that the elevation of the rear edge of the plate varies with the variable overall length of the cylinder.

33. The vehicle leveler of claim 32, wherein the mount is a trunnion.

34. A vehicle leveler adapted to be pivotally mounted to a driveway to adjust the elevation of at least two wheels of a vehicle parked on the leveler, comprising; a plate having an upper traffic surface and a substantially parallel and opposite lower surface that extends between a vehicle-approach edge and a rear edge of the plate, wherein the upper traffic surface is adapted to engage the two wheels, wherein the vehicle-approach edge is adapted to be pivotally coupled to the driveway to vertically adjust the elevation of the rear edge between a lowered position and a raised position, and wherein the lower surface is immediately adjacent the driveway in the lowered position.

35. The vehicle leveler of claim 34, wherein the plate is of sufficient resilience to allow itself to be bent elastically to place the lower surface directly against the driveway in the lowered position.

36. The vehicle leveler of claim 34, further comprising a cylinder that includes a cylinder housing and an extendible rod, wherein the cylinder has a variable overall length extending from a cylinder base to a rod end, and further comprising a mount attached to the cylinder housing at an intermediate position between the cylinder base and the rod end, wherein the mount couples the cylinder housing to the upper traffic surface such that the elevation of the rear edge of the upper traffic surface varies with the variable overall length of the cylinder.

37. The vehicle leveler of claim 36, wherein the mount is a trunnion.

38. A vehicle leveler adapted to be pivotally mounted to a driveway to adjust the elevation of at least two wheels of a vehicle parked on the leveler, comprising:

a plate having an upper traffic surface extending between a vehicle-approach edge and a rear edge of the plate and extending between two lateral edges of the plate, wherein the vehicle-approach edge is adapted to be pivotally coupled to the driveway to vertically adjust the elevation of the rear edge, and wherein the plate has a substantially parallel and opposite lower surface immediately adjacent to the driveway; and a support structure rigidly mounted to the plate, wherein the support structure is formed of a rear beam rigidly mounted to the plate, extending above the upper traffic surface and running adjacent the rear edge to add an appreciable amount of rigidity to the upper traffic surface and wherein the support structure is formed of two lateral beams rigidly mounted to the plate, extending above the upper traffic surface and coupled to the plate at a location adjacent the two lateral edges of the plate.

39. The vehicle leveler of claim 38, further comprising a wheel restrain situated to remain primarily above the upper traffic surface and adapted to obstruct at least one of the two wheels, wherein the wheel restraint includes a track that is located substantially near one side of the leveler to allow the vehicle to travel between the track and one of the two lateral beams.

* * * * *